US007501376B2

(12) United States Patent
Dufresne et al.

(10) Patent No.: US 7,501,376 B2
(45) Date of Patent: Mar. 10, 2009

(54) OXIDIZING HEAT TREATMENT PASSIVATION OF SULPHIDE HYDROTREATMENT CATALYST

(75) Inventors: Pierre Dufresne, Valence (FR); Franck Labruyere, Saint Georges les Bains (FR)

(73) Assignee: Eurecat S.A., La Voulte sur Rhone (FR)

( * ) Notice: Subject to any disclaimer, the term of this patent is extended or adjusted under 35 U.S.C. 154(b) by 485 days.

(21) Appl. No.: 10/529,378

(22) PCT Filed: Sep. 25, 2003

(86) PCT No.: PCT/FR03/02819

§ 371 (c)(1),
(2), (4) Date: Nov. 1, 2005

(87) PCT Pub. No.: WO2004/028691

PCT Pub. Date: Apr. 8, 2004

(65) Prior Publication Data

US 2006/0154813 A1 Jul. 13, 2006

(30) Foreign Application Priority Data

Sep. 27, 2002 (FR) .................................. 02 12034

(51) Int. Cl.
*B01J 27/02* (2006.01)
*B01J 27/047* (2006.01)
*B01J 27/051* (2006.01)
*B01J 27/049* (2006.01)
*B01J 27/043* (2006.01)
*B01J 27/045* (2006.01)

(52) U.S. Cl. ...................... 502/216; 502/219; 502/220; 502/221; 502/222; 502/223

(58) Field of Classification Search ................. 502/216, 502/219–223
See application file for complete search history.

(56) References Cited

U.S. PATENT DOCUMENTS

| 3,122,497 | A | * | 2/1964 | Erickson ................. 208/120.01 |
| 3,146,188 | A | * | 8/1964 | Gossett ........................ 208/73 |
| 3,287,257 | A | * | 11/1966 | Hansford et al. ....... 208/111.15 |
| 4,029,599 | A | * | 6/1977 | Pegels .......................... 502/30 |
| 5,922,638 | A | | 7/1999 | Dufresne et al. |
| 6,059,956 | A | * | 5/2000 | Dufresne .................... 208/108 |
| 6,753,291 | B2 | * | 6/2004 | Eijsbouts et al. ............ 502/216 |
| 2002/0000394 | A1 | | 1/2002 | Eijsbouts |

OTHER PUBLICATIONS

Louwers, Crajé, Van Der Kraan, Geantet, Prins: "The effect of passivation on the activity and structure of sulfided hydrotreating catalysts" Journal of Catalysis, vol. 144, No. 2, Dec. 1993.

* cited by examiner

*Primary Examiner*—Patricia L Hailey
(74) *Attorney, Agent, or Firm*—Millen, White, Zelano & Branigan, P.C.

(57) ABSTRACT

This invention relates to a process of ex-situ oxidizing passivation of catalysts for hydroconversion of hydrocarbons and especially of hydrotreating, in their sulfide state, process in which the sulfurized catalyst is brought into contact with an oxidizing gas flow that can be dry or wet, during heat treatment at more than 50° C. This invention, for passivation of sulfide phases, can be equally well implemented for a process that takes place in a fixed bed or a fluidized bed, for example a moving bed.

20 Claims, No Drawings

OXIDIZING HEAT TREATMENT PASSIVATION OF SULPHIDE HYDROTREATMENT CATALYST

Hydrotreating catalysts generally comprise an amorphous or crystallized oxide carrier (such as, for example, an alumina, a silica, a silica-alumina, a zeolite) on which at least one element of groups VIII and VI of the periodic table are deposited, or a combination of several elements originating from these same groups, such as, for example, solids designated $CoMo/Al_2O_3$, $NiMo/Al_2O_3$ or $NiW/Al_2O_3$ must be presulfurized in order to impart to them catalytic performances for the set of hydrocarbon hydroconversion reactions, especially hydrotreating (such as, for example, hydrodesulfurization, hydrodenitrating, demetallation) and hydrogenation of unsaturated hydrocarbons. This sulfurization stage that precedes the catalytic action can be implemented in two different ways.

The first, called in-situ sulfurization, which is characterized in that the catalyst in its oxide form is first of all loaded into the hydrocarbon conversion reactor to be sulfurized there. The second, called ex-situ presulfurization, as described in various patents of the assignee or the predecessor in interest (U.S. Pat. Nos. 4,719,195, 5,397,756, EP-A 785022), differs from the preceding one in that sulfurization or presulfurization of the catalyst is done in a specific unit that is separate from the hydrocarbon conversion reactor, and in particular is located away from the utilization site of said catalyst.

Within the framework of this latter method of ex-situ sulfurization, the sulfide phases that have been formed in this way have very high reactivity relative to ambient air, thus preventing their subsequent handling without complementary treatment that is designed to limit this reactivity. This reactivity with respect to oxidizing atmospheres is described by a United Nations standard that defines two classes of behavior, i.e., a so-called pyrophoric behavior, and a so-called self-heating behavior.

The pyrophoric nature of a compound is characterized by spontaneous combustion when placed in an oxidizing atmosphere. The self-heating nature is characterized by a major increase in temperature resulting from rapid oxidation when the product is heated under certain conditions to a temperature of 140° C.

The sulfide phase that is obtained as a result of these processes of presulfurization turns out to be self-heating; to eliminate this defect and to passivate this phase, the prior art describes methods that consist in causing this sulfide phase to adsorb a certain amount of oxygen. These methods have a certain effect, but are sometimes inadequate. The patent of the prior art EP 0 707 890 describes a stage of oxidizing passivation of a presulfurized catalyst under a gas flow containing less than 30% by volume of oxygen or less than 30 kPa of oxygen partial pressure (preferably less than 10, 5% or 1%), this treatment being carried out at the ambient temperature. Patent Application WO-98/37,963 likewise describes a stage of oxidizing passivation of a presulfurized conversion catalyst under a gas flow containing 0.25-21 % by volume of oxygen or 0.25-21 kPa of oxygen partial pressure (preferably 0.5-1.5%) at a temperature of at most 50° C. US 2002 000 394 or "the article of Louwers et al. Vol. 144 No. 2 1993-12, pp. 579-596," likewise describe catalyst passivation, but without adhering to operating conditions that can be used on an industrial scale in refinement or petrochemistry.

If the above-described treatments may seem adequate for handling a small amount of sulfurized and passivated catalyst in air, without taking major precautions they do not allow loading of the reactors of hydrotreating units with said catalyst in air, because the self-heating behavior is still overly prominent. Thus, a process was sought that raises the self-heating temperature while maintaining as much as possible good catalytic performance levels.

Thus, this invention suggests a process of passivation by heat treatment under a gas flow containing an oxygen partial pressure, in the presence or absence of water vapor, thus imparting to said catalyst a behavior that is not self-heating.

One major advantage of the process of this invention that will be described in detail below is as follows: with the processes of the prior art, it was indeed possible in certain cases to handle the sulfide phase in air; conversely, loading the catalyst into the reactor in the presence of air was able to produce heating of the catalyst due to its significant mass, and then to engender a dangerous environment. Thus, loading the catalyst into the reactor in air had been vigorously discouraged (although some users continued to do so), but it was recommended for greater safety that it be done under nitrogen atmosphere. With the process according to the invention, loading a reactor in air with a catalyst in the sulfide phase form now becomes possible and safe.

More exactly, this invention relates to the implementation of a process of passivation, following ex-situ sulfurization of the catalyst, by heat treatment in the presence of a gas (or gas flow) containing oxygen (for example, originating from dry or humid air). This passivation process can also be implemented on a catalytic feedstock placed in a fixed bed (such as in a tubular reactor) or in a catalytic feedstock placed in a fluidized bed, specifically a moving bed as in, for example, a rotary kiln, a fluidized-bed furnace, a belt furnace or a sinking-bed furnace. In the invention, the sulfide phase is treated when hot, i.e., at a temperature of greater than 50° C., or else greater than or equal to 55° C., preferably at most 120° C. or else between 75 and 120° C., by a gas with an oxygen partial pressure of preferably at least 2 kPa, preferably at least 7 kPa. In general, the partial pressure is at most or less than 21.3 kPa. This makes it possible for a phase that is decreasingly heat-generating to be present.

As the examples show, the process can be advantageously implemented in two stages, the first with an oxygen partial pressure that is preferably greater than or equal to 2 kPa, and also more preferably at least 7 kPa, the second stage with an oxygen partial pressure greater than that of the first stage, the second stage beginning with the disappearance of the exothermal effect.

In one preferred embodiment of this invention, in order to reduce the self-heating behavior of the presulfurized catalyst to allow its easy handling in air, especially when they are loaded into hydrotreating units, said catalyst is temperature-treated under a wet gas flow containing an oxygen partial pressure that can reach preferably 21.3 kPa and a water partial pressure that is greater than or equal to 2 kPa and that can extend to water-saturated atmosphere.

EXAMPLE 1

Preparation of the Reference Catalyst: Ex-situ Sulfurization Without Passivation A hydrotreating catalyst containing 18.9% by weight molybdenum oxide and 4.2% by weight of cobalt oxide deposited on an alumina carrier with a large specific surface area (220 $m^2/g$) is sulfurized at atmospheric pressure by a mixture composed of 60% by volume of hydrogen sulfide ($H_2S$) and 40% by volume of hydrogen ($H_2$). Sulfurization of the catalyst is obtained in two stages, the first being a phase of a controlled temperature increase (5° C./min), the second being a plateau of 1.5 hours at the final sulfurization temperature of 300° C. After sulfurization, the catalyst is cooled under a nitrogen flow up to ambient temperature. One portion of the product is transferred under nitrogen atmosphere for analysis of the level of sulfurization. The remainder is isolated under nitrogen and is used to characterize the self-heating behavior and to measure the activity in hydrodesulfurization of gas oil.

The experimental molar ratio S/Co+Mo and the sulfurization level are indicated in the table below. The sulfurization level is defined as the relationship between the experimental molar ratio S/(Co+Mo) and the theoretical molar ratio S/(Co+Mo), multiplied by 100, this theoretical ratio corresponding to the total transformation of the molybdenum oxide $MoO_3$ and cobalt oxide CoO into the sulfides $MoS_2$ and $Co_9S_8$ respectively being: $[S/(Co+Mo)]_{theo}=1.67$.

| Reference | S/(Co + Mo) | Sulfurization level (%) |
|---|---|---|
| Catalyst S | 1.59 | 95 |

The self-heating test is that defined by the UN standard that makes it possible to classify dangerous products of class 4.2. A modified test is also used to gain more information about the sensitivity of the characterized product.

The test of the UN standard (code IMDG): a catalyst is placed in a wire mesh cube with 10cm edges; in the center of this cube is inserted a thermocouple that makes it possible to record the temperature increase of the 1 liter cube filled with catalyst. The combination of the cube and thermocouple is then placed inside a ventilated drying oven in air that has been preheated to 140° C. For 24 hours, the temperatures of the drying oven and the cube of the catalyst are recorded. The catalyst is acknowledged to be self-heating if its temperature during the 24 hours of the test exceeds 200° C. It then belongs to the class of dangerous products, class 4.2, solid subgroup 3190.

The modified test, to determine the temperature of self-heating, repeats the same operating mode except for the temperature of the drying oven varying around 140° C. in increments of 10° C. until the internal temperature of the catalyst cube no longer exceeds 200° C. At each temperature, a new liter of catalyst is tested. The idea of the critical self-heating temperature (or TCAE) is defined by the minimum temperature of the drying chamber before triggering the self-heating behavior of the characterized catalyst.

In parallel with the self-heating test, the catalyst is loaded under nitrogen atmosphere into the reactor of a test unit for hydrodesulfurization of gas oil. The steady operation of the catalyst is obtained by progressively increasing the ambient temperature to 350° C. in the presence of a flow rate of gas oil of 2 liters per liter of catalyst per hour, at a hydrogen pressure of 3 MPa and a hydrogen flow rate expressed as the ratio of hydrogen to oil of 400 l/l. After 8 hours of stabilization under these conditions, the temperature is reduced to 330° C. After 24 hours of stabilization, the liquid discharges are collected for 15 hours, the residual sulfur level being measured by X fluorescence and compared to the initial level of the gas oil. The activity model uses a mathematical expression that adopts a reaction order of 1.5. The relative weight activity (RWA) is expressed by the ratio between the activity of the tested catalyst and that of the same sulfurized oxide catalyst in the in-situ mode by addition of DMDS (dimethyl disulfide) to the liquid feedstock.

EXAMPLE 2

Oxidizing Passivation at Ambient Temperature

The same catalyst as that used in Example 1 is sulfurized (same conditions as in Example 1) and purged under nitrogen at ambient temperature, then passivated according to the so-called oxidizing passivation procedure at the ambient temperature (20° C.). This treatment is done in two stages. The first stage consists in treatment under a dry gas flow (air+nitrogen) containing an oxygen partial pressure of 7.6 kPa. The catalyst is kept under this oxygen partial pressure until the disappearance of the exothermal effect that is tied to chemisorption of the oxygen on the sulfide phase (measured by the drop in temperature). The second stage is obtained by stopping the diluent gas (nitrogen) supply such that the oxygen partial pressure is that of dry air (21.3 kPa). The catalyst is left under this air flow until the exothermal effect that is tied to the interaction of the oxygen and the sulfide phase disappears. After this passivation treatment, the catalyst is stored under nitrogen atmosphere. A portion of the sample is then removed under nitrogen in order to analyze the sulfurization level and the fixed oxygen content during passivation treatment. The remainder is isolated under this same atmosphere for characterization of its self-heating behavior and for measurement of its activity in the hydrodesulfurization of gas oil.

The molar ratio of S/Co+Mo, the sulfurization level as well as the amount of oxygen that is chemisorbed during the passivation treatment are shown in the table below. The amount of chemisorbed oxygen is determined by the difference between the experimental fire loss measured on the passivated catalyst (muffle furnace treatment in air at 500° C. for 4 hours) and the theoretical fire loss defined for an identical sulfurization level.

| Reference | S/(Co + Mo) | Sulfurization Level (%) | $O_2$ (% By Weight) |
|---|---|---|---|
| Catalyst SP2 | 1.59 | 95 | 1.6 |

The activity test on this catalyst that is called "catalyst SP2" uses the same test protocol as that described in Example 1.

EXAMPLE 3

Passivation of a Sulfurized Catalyst by Heat Treatment at Moderate Temperature Under a Dry Oxidizing Flow The same catalyst as the one that is used in Example 1 is sulfurized (same conditions as in Example 1) and purged under nitrogen at ambient temperature. The catalyst is then passivated using the same passivation protocol as that used in Example 2 except for the passivation temperature that is raised to 50° C. Once the catalyst is at this temperature, a dry air/nitrogen flow with an oxygen partial pressure of 7.6 kPa is introduced into the reaction chamber. After the disappearance of the thermal effect that is tied to chemisorption of the oxygen on the sulfide phases, the nitrogen flow is cut off and the catalyst is kept solely under an air flow (oxygen partial pressure of 21.3 kPa). It is kept under this atmosphere until the temperature returns to 50° C., then cooled under nitrogen to ambient temperature. The catalyst SP3 that was thus obtained is characterized according to a methodology that is analogous to that of Example 2.

| Reference | S/(Co + Mo) | Sulfurization Level (%) | $O_2$ (% By Weight) |
| --- | --- | --- | --- |
| Catalyst SP3 | 1.59 | 95 | 1.7 |

EXAMPLE 4

Passivation of a Sulfurized Catalyst by Treatment Under a Dry Oxidizing Flow at Low Oxygen Partial Pressure The same catalyst as the one that is used in Example 1 is sulfurized (same conditions as in Example 1) and purged under nitrogen at ambient temperature, then reheated to a temperature of 100° C. A gas flow composed of a dry air/nitrogen mixture containing an oxygen partial pressure of 2.0 kPa is introduced. The catalyst is kept under this atmosphere until the exothermal effect disappears completely and the temperature returns to 100° C. It is then cooled under a nitrogen flow to ambient temperature. The catalyst SP4 that was thus obtained is characterized according to a methodology that is analogous to that of Example 2.

| Reference | S/(Co + Mo) | Sulfurization Level (%) | $O_2$ (% By Weight) |
| --- | --- | --- | --- |
| Catalyst SP4 | 1.55 | 93 | 2.1 |

EXAMPLE 5

Passivation of a Sulfurized Catalyst by High-Temperature Heat Treatment Under a Dry Oxidizing Flow The same catalyst as the one that is used in Example 1 is sulfurized (same conditions as in Example 1) and purged under nitrogen at ambient temperature, then heated to a temperature of 120° C. A gas flow composed of a dry air/nitrogen mixture containing an oxygen partial pressure of 7.6 kPa is introduced. After the thermal effect disappears, the nitrogen flow is cut off and the catalyst is kept solely under an air flow (oxygen partial pressure of 21.3 kPa). It is kept under this atmosphere until the temperature returns to 120° C. It is cooled under nitrogen to ambient temperature. The catalyst SP5 that was thus obtained is characterized according to a methodology that is analogous to that of Example 2.

| Reference | S/(Co + Mo) | Sulfurization Level (%) | $O_2$ (% By Weight) |
| --- | --- | --- | --- |
| Catalyst SP5 | 1.37 | 82 | 5.5 |

The value of the sulfurization level is less than that of the preceding catalysts, probably due to the start of oxidation of the sulfide phases into sulfur dioxide.

EXAMPLE 6

Passivation of a Sulfurized Catalyst by Heat Treatment Under a Dry Oxidizing Flow in a Fixed Bed The same catalyst as the one that is used in Example 1 is sulfurized (same conditions as in Example 1) and purged under nitrogen at ambient temperature. The catalyst is then passivated by using the same passivation protocol as that used in Example 2 except for the passivation temperature that is raised to 100° C. Once the catalyst is at the passivation temperature, the dry air/nitrogen flow with an oxygen partial pressure of 7.6 kPa is introduced. After the disappearance of the thermal effect that is tied to chemisorption of the oxygen on the sulfide phases, the nitrogen flow is cut off and the catalyst is kept solely under air flow (oxygen partial pressure of 21.3 kPa). After the thermal effect disappears, the catalyst is cooled under nitrogen to ambient temperature. The catalyst SP6 that was thus obtained is characterized according to a methodology that is analogous to that of Example 2.

| Reference | S/(Co + Mo) | Sulfurization Level (%) | $O_2$ (% By Weight) |
| --- | --- | --- | --- |
| Catalyst SP6 | 1.55 | 93 | 3.7 |

EXAMPLE 7

Passivation of a Sulfurized Catalyst by Heat Treatment Under a Wet Oxidizing Flow in a Fixed Bed The preparation protocol is analogous to that of Example 6, except for the dry air being replaced by humid air. The gas mixture has oxygen partial pressures of 7.6 kPa and water partial pressures of 3.0 kPa. The catalyst SP7 that was thus obtained is characterized according to a methodology that is analogous to that of Example 2. The amount of water is determined by thermogravimetry under nitrogen at 120° C.

| Reference | S/(Co + Mo) | Sulfurization Level (%) | $O_2$ (% By Weight) | $H_2O$ (% By Weight) |
| --- | --- | --- | --- | --- |
| Catalyst SP7 | 1.51 | 91 | 3.7 | 1.8 |

EXAMPLE 8

Passivation of a Sulfurized Catalyst in a Moving Bed by Heat Treatment Under a Dry Oxidizing Flow The same catalyst as the one that is used in Example 1 is sulfurized in a rotary tube pilot unit at atmospheric pressure by an $H_2S/H_2$ mixture with a 60/40 volumetric composition at a temperature of 300° C. for 3 hours. At the outlet of the tube, the catalyst is stored in a sealed chamber with nitrogen scavenging. Then, the rotary unit is purged under nitrogen and cooled to a temperature of 100° C. Then, the catalyst is placed again in the loading hopper of the rotary unit under nitrogen atmosphere. Pure air is introduced into the furnace at a flow rate that has been determined such that the amount of oxygen introduced per unit of catalyst mass does not exceed 1.5 times that determined in Example 6, i.e., 200 Nlt/h of air per 1 kg/h of sulfurized catalyst. The dwell time of the product in the furnace is 3 hours at 100° C. Then, a sample is taken under nitrogen for conducting analyses according to the same methodology as the one that is used in Example 1.

| Reference | S/(Co + Mo) | Sulfurization Level (%) | $O_2$ (% By Weight) |
|---|---|---|---|
| Catalyst SP8 | 1.60 | 96 | 4.2 |

EXAMPLE 9

Results of Characterizations and Conclusion

Activity in hydrodesulfurization of gas oil, relative weight activity (RWA) and critical self-heating temperature (TCAE):

| Référence | Caractéristique | | Activité | RWA (%) | TCAE (° C.) |
|---|---|---|---|---|---|
| — | Sulfuration in-situ | | 6.81 | 100 | / |
| Catalyseur S | Sulfuration ex-situ et pas de passivation | | 6.68 | 98 | <25 |
| Catalyseur SP2 | T = 20° C. - $P_{O2}$ = 7.6 kPa | T = 20° C. - $P_{O2}$ = 21.3 kPa | 7.01 | 103 | 75 |
| Catalyseur SP3 | T = 50° C. - $P_{O2}$ = 7.6 kPa | T = 50° C. - $P_{O2}$ = 21.3 kPa | 6.74 | 99 | 85 |
| Catalyseur SP4 | T = 100° C. - $P_{O2}$ = 2.0 kPa | — | 6.90 | 101 | 95 |
| Catalyseur SP5 | T = 120° C. - $P_{O2}$ = 7.6 kPa | T = 120° C. - $P_{O2}$ = 21.3 kPa | 6.06 | 89 | 145 |
| Catalyseur SP6 | T = 100° C. - $P_{O2}$ = 7.6 kPa | T = 100° C. - $P_{O2}$ = 21.3 kPa | 6.78 | 100 | 115 |
| Catalyseur SP7 | T = 100° C. – $P_{H2O}$ = 3.0 kPa – $P_{O2}$ = 7.6 kPa | T = 100° C. - $P_{O2}$ = 3.0 kPa – $P_{O2}$ = 21.3 kPa | 6.64 | 98 | 135 |
| Catalyseur SP8 | T = 100° C. - $P_{O2}$ = 21.8 kPa lit mobile | — | 6.91 | 101 | 140 |

[Key:]
Référence = Reference
Caractéristique = Characteristic
Activité = Activity
Catalyseur = Catalyst
Sulfuration in-situ = In-situ sulfurization
Sulfuration ex-situ et pas de passivation = Ex-situ sulfurization and no passivation
Lit mobile = Moving bed In conclusion, it appears that an unpassivated sulfurized catalyst cannot be handled in air. Oxidizing passivation alone at ambient temperature improves the self-heating behavior thereof to allow certain handling of the product in air. Nevertheless, the product remains sensitive, and it would not be a good idea to allow loading into large hydrotreating units in air. Heat treatment (temperature greater than 50° C.) for oxidizing passivation under an oxygen partial pressure of preferably at least 7 kPa is useful to adequately diminish this self-heating nature. A value that is considered acceptable could preferably be one beginning at a TCAE of 100° C. The operating criteria that allow an improvement of self-heating properties are the temperature, the oxygen and water partial pressures, as well as the type of process. The temperature should be raised enough, beyond 50° C., to modify the depth of the sulfide phase. The amount of oxygen should be enough, preferably beyond 2.0 kPa, according to the implemented examples, even if these values are not exhaustive.

In contrast, the temperature/oxygen partial pressure pair must be adjusted to control the intensity of the oxidation reaction. Example 5 thus shows that passivation is very efficient, but the sulfurization level suffers in the process (loss of sulfur by volatilization of sulfur dioxide), as does the catalytic activity. Temperatures of less than 120° C. are thus advantageous. It should be noted that two-stage passivation is often advisable.

Finally, the addition of moisture to the gas makes it possible to further improve the passivating effect as well as passage into a moving-bed furnace rather than a fixed-bed furnace.

In contrast, it should be noted that this new oxidizing passivation process in heat treatment in the presence or absence of water vapor changes nothing in the catalytic performances of the sulfide phases for hydrotreating reactions.

The invention claimed is:

1. A process of ex-situ oxidizing passivation of a catalyst for hydroconversion of hydrocarbons in which a presulfurized catalyst at a temperature between 75 and 120° C. is subjected to treatment in a passivation chamber by a gas containing molecular oxygen and in which the oxygen partial pressure in the gas is at least 7 kPa.

2. A process according to claim 1, wherein the oxygen partial pressure in said gas is at most 21.3 kPa.

3. A process according to claim 1, wherein said gas is dry.

4. A process according to claim 1, wherein said gas is wet.

5. A process according to claim 4, wherein the water partial pressure is at least 2 kPa.

6. A process according to claim 1 implemented in two stages, the first with an oxygen partial pressure of greater than 7 kPa, the second stage with an oxygen partial pressure of greater than that of the first stage, said second stage beginning with the disappearance of the exothermal effect.

7. A process according to claim 1 applied to hydrotreating catalysts.

8. A process according to claim 1 applied to hydrogenation catalysts.

9. A process according to claim 1 implemented within the framework of a process taking place in a moving bed.

10. A process according to claim 1 implemented within the framework of a process taking place with a fluidized bed.

11. A process according to claim 1 applied to fresh catalysts.

12. A process according to claim 1, further comprising transporting the catalyst from the passivation chamber to a hydroconversion unit.

13. A process according to claim 1, wherein the presulfurized catalyst consists essentially of sulfur, molybdenum and cobalt.

14. A process according to claim 13, further comprising transporting the catalyst from the passivation chamber to a hydroconversion unit.

15. A process according to claim 14 implemented within the framework of a process taking place in a moving bed.

16. A process according to claim 1, wherein prior to passivation, the catalyst is subjected to ex situ sulfurization.

17. A process according to claim 15, wherein prior to passivation, the catalyst is subjected to ex situ sulfurization.

18. A process according to claim 17 applied to fresh catalysts.

19. A process according to claim 1 applied to fresh catalysts.

20. A process according to claim 1, said passivation being sufficient to yield a catalyst having a critical self-heating temperature of at least 100° C.

* * * * *